United States Patent Office 3,796,776
Patented Mar. 12, 1974

3,796,776
VINYL CHLORIDE POLYMER BLENDED WITH A CROSS-LINKED VINYL CHLORIDE POLYMER
Fumio Ide and Tsuneo Kodama, Otake, and Isao Sasaki, Iwakuni, Japan, assignors to Mitsubishi Rayon Company Limited, Tokyo, Japan
No Drawing. Filed July 15, 1971, Ser. No. 163,065
Claims priority, application Japan, July 20, 1970, 45/62,775
Int. Cl. C08f 29/24
U.S. Cl. 260—899
3 Claims

ABSTRACT OF THE DISCLOSURE

It has been found that processabilities of vinyl chloride polymer or copolymer can be improved, without affecting the surface characteristics and mechanical properties thereof, by the incorporation of 0.1 to 20% by weight of a cross-linked vinyl chloride copolymer.

---

This invention relates to a vinyl chloride polymer composition which is superior in processabilities and particularly, suitable for, extruding, blow molding and vacuum forming thereof, and from which shaped articles possessing excellent surface characteristics such as lustre and transparency and superior mechanical properties are obtainable.

In general, vinyl chloride polymers are superior in physical and chemical properties such as toughness, ageing resistance, chemical resistance, etc., whereas they have many defects in processabilities due to their deficiency in plasticity and particularly, severe conditions are enforced upon processing such as extruding, vacuum forming and blow molding thereof. It is consequently difficult to obtain a shaped article possessing excellent lustre and transparency. Up to now, in order to obviate some of the defects, plasticizer or acrylic polymer have been incorporated into vinyl chloride polymer. However, the incorporation of plasticizer results in shaped articles possessing a reduced hardness and a lowered softening point, and the incorporation of acrylic polymer results in the deterioration of transparency because the polymer is inferior in compatibilty or dispersibility into vinyl chloride polymer.

It has now been found that, the incorporation of 0.1 to 20% by weight of cross-linked vinyl chloride copolymer prepared by copolymerization of vinyl chloride with at least one copolymerizable polyfunctional monomer, into a vinyl chloride polymer, provides a useful composition which does not have the above drawbacks and has improved processabilities and from which shaped articles possessing excellent surface characteristics such as lustre and transparency and superior mechanical properties are obtainable.

The vinyl chloride polymer of the present invention includes polyvinyl chloride and a copolymer containing no less than 50% by weight of vinyl chloride and no more than 50% by weight of at least one other copolymerizable ethylenic unsaturated monomer, for example, olefins such as ethylene, propylene, etc.; halogenated olefins such as dichloroethylene, etc.; vinyl esters such as vinyl acetate, etc.; and esters of acrylic acid and methacrylic acid and the like.

The cross-linked vinyl chloride copolymer to be incorporated into the above-mentioned vinyl chloride polymer is one which is prepared by copolymerizing a mixture of 50 to 99.95% by weight of vinyl chloride 0.05 to 10% by weight of at least one copolymerizable polyfunctional monomer and 0 to 49.95% by weight of at least one of the other copolymerizable ethylenic unsaturated monomers. The polyfunctional monomer includes, for example, divinyl compounds such as divinylbenzene, divinyl adipate, etc.; glycidyl compounds such as glycidyl acrylate, glycidyl methacrylate, etc.; ethylene glycolic compounds such as diacrylic or dimethacrylic acid ester of mono-, di-, tri- or tetra-ethylene glycol, bis-, mono- or diethylene glycol) phthalate dimethacrylate or diacrylate, etc.; and allyl compounds such as allyl methacrylate, diallyl ester of maleic acid, itaconic acid or phthalic acid, triallyl cyanurate, etc. The other copolymerizable ethylenic unsaturated monomer to be copolymerized into the cross-linked vinyl chloride copolymer includes, for example, olefins such as ethylene, propylene, etc.; halogenated olefins such as dichloroethylene, etc.; vinyl esters such as vinyl acetate, etc.; and esters of acrylic acid and methacrylic acid and the like.

The cross-linked vinyl chloride copolymer may be prepared by any conventional process known for the polymerization of vinyl chloride. However, it is advantageous that the resulting copolymer is produced in the form of a fine particle or a powder because of its superior dispersibility into the vinyl chloride polymer in the compounding and processing of the vinyl chloride composition and therefore, for example, emulsion or suspension polymerization is an aqueous medium is preferred. Particularly, the cross-linked vinyl chloride copolymer prepared by emulsion polymerization results in the composition from which shaped articles having better uniformity and surface characteristics are obtainable.

A preferred embodiment of the emulsion polymerization is illustrated as follows: Deionized water, an emulsifier and a pH regulator are charged into an autoclave. To the mixture, after being blown with nitrogen, vinyl chloride and a copolymerizable polyfunctional monomer and, if desired, a copolymerizable ethylenic unsaturated monomer are added. The mixture is heated to the predetermined polymerization temperature and followed by the addition of a catalyst dissolved in a small amount of water to initiate polymerization. Emulsifiers to be used in the copolymerization are not critical, i.e. may be suitably selected from nonionic and anionic surface active agents. However, anionic surface active agents, particularly, for example, sodium alkyl-sulfo-succinate, potassium salt of higher fatty acid such as stearic acid and oleic acid and the like are preferred; these emulsifiers result in copolymers wherein color formation is considerably minimized. A copolymer latex, thus produced, is coagulated by the addition of an inorganic salt, recovered by filtration, washed with water, and then, dried to a powder.

A vinyl chloride polymer, which is the main component of the present composition, may be prepared by conventional polymerization methods.

Apparently the particular manner whereby the cross-linked vinyl chloride copolymer is incorporated into the vinyl chloride polymer is also not critical. The cross-linked vinyl chloride copolymer can, for example, be simply physically blended in a dry state with the vinyl chloride polymer by a conventional mixer such as a Henschel mixer. Further, small amounts of additives such as stabilizer, colorant, plasticizer, filler and the like may be incorporated into the composition of the present invention, if desired.

In the practice of the present invention, at least 0.1% by weight, based on the weight of the composition, of the cross-linked vinyl chloride copolymer should be present in the resulting composition in order that at least some benefit of the present invention may be obtained. The incorporation of a large amount, i.e. exceeding 20%, of the cross-linked copolymer results in the composition possessing inferior surface characteristics. It is therefore preferred that the total amount of the cross-linked vinyl chloride copolymer present in the composition is within the range of 0.1 to 20% by weight.

In general, a linear polymer, when it is cross-linked, exhibits an increased tensile strength but a reduced elongation. However, it should be noted that the vinyl chloride polymer composition of the present invention wherein the above cross-linked vinyl chloride copolymer is incorporated in the above-mentioned proportion exhibits increased elongation and Young's modulus besides an increased tensile strength. Particularly, the elongation in a high temperature range exceeding a second order transition temperature of polyvinyl chloride is approximately 1.3 to 2.0 times its original elongation. Consequently, when the composition of the present invention is shaped into a sheet by, for example, an extruder provided with a T-die, breakage and unevenness in thickness cannot be observed and the resulting sheet possesses excellent lustre and transparency. Further, the resulting sheet, as compared with that prepared from only vinyl chloride polymer without adding the cross-linked vinyl chloride copolymer, can be subjected to vacuum forming at a wider temperature range and shaped into an article having a greater depth, further leading to the diminution of surface cracks which have often been observed in a conventionally shaped article. The composition also presents marked features in the other shaping processes, for example, it is more advantageously subjected to blow molding and injection molding in which the composition exhibits a higher fluidity.

Moreover, because both polymers contain vinyl chloride as the principal ingredient, they exhibit better dispersibility or compatibility with each other. Consequently, the shaped articles have excellent uniformity and are superior in surface lustre and transparency, with little or no fish-eye. The surface characteristics are approximately equal to or better than those of the shaped article manufactured from only vinyl chloride polymer without adding the cross-linked vinyl chloride copolymer.

As is apparent from the above illustration, the composition of the present invention may be shaped into any desired form by a suitable shaping process such as injection molding, extrusion, blow molding, vacuum forming and the like.

The invention will be further illustrated with reference to examples, in which all "parts" and "percent" are "by weight."

EXAMPLE 1

(A) Preparation of a cross-linked vinyl chloride copolymer 370 parts of deionized water, 1 part of disodium hydrogenphosphate and 1 part of sodium sulfosuccinate were charged into an autoclave. To the mixture, after being blown with nitrogen, 100 parts of vinyl chloride and 1 part of ethylene glycol dimethacrylate (hereinafter referred to as EDMA for brevity) were added and followed by heating. When the temperature of the mixture reached 50° C., 0.5 part of hydrogen peroxide dissolved in 30 parts of deionized water was added to the mixture to initiate polymerization. Polymerization was carried out at a temperature of 50° C. over a period of 2 hours, at the end of which period conversion reached 90%, and completed by heating for an additional 2 hours while being stirred. The polymer latex, thus prepared, was poured into 1,000 parts of 0.1% aqueous solution of aluminum chloride to be coagulated. Then, the coagulated polymer was agglomerated by heating. The polymer was recovered by filtration, washed with water, and then, dried to obtain a powder (hereinafter referred to as resin I).

(B) Preparation of vinyl chloride polymer composition 100 parts of polyvinyl chloride having a degree of polymerization of 720 and 2 parts of tin stearate stabilizer were thoroughly mixed by a Henschel mixer, followed by the addition of the cross-linked vinyl chloride copolymer (resin I) in various proportions as shown in Table 1 to obtain a vinyl chloride polymer composition.

The composition was extruded into a sheet through an extruder having a diameter of 40 mm. and equipped with a T-die with the temperature of the resin being kept at 185° C. The resultant sheet, as compared with that produced from polyvinyl chloride without adding the cross-linked vinyl chloride copolymer (resin I), proved to have excellent surface smoothness and lustre and better uniformity in thickness of sheet.

Characteristics of the sheet are shown in Table 1.

TABLE 1

| Added amounts of Resin I (percent) | Haze (percent) | Tensile strength (kg./cm.$^2$) | Elongation (percent) |
|---|---|---|---|
| 0 | 11.4 | 52.0 | 331.5 |
| 0.1 | 10.3 | 52.5 | 406.8 |
| 0.5 | 9.6 | 53.1 | 464.4 |
| 1 | 8.8 | 53.3 | 497.9 |
| 3 | 9.2 | 56.4 | 552.4 |
| 5 | 9.0 | 60.9 | 551.9 |
| 10 | 10.4 | 54.8 | 566.7 |
| 15 | 9.9 | 62.3 | 568.2 |
| 20 | 11.5 | 62.0 | 570.4 |

Haze (percent) was determined according to JIS K 6714 as to a thin plate specimen prepared from the above sheet by compression molding at a temperature of 195° C. Tensile strength (kg./cm.$^2$) and elongation (percentage elongation at break, percent) were determined according to JIS K 6301 as to a #3 dumbbell specimen prepared from the above thin plate under the following testing conditions: temperature, 90° C.; load, 100 kg.; initial distance between grips, 30 mm.; rate of grip separation, 200 mm./min.

It is evident from Table 1 that the thin plate, as compared with that prepared from polyvinyl chloride without adding the cross-linked vinyl chloride copolymer (resin I), has an equal or lower haze, corresponding closely with the better transparency of the above sheet, and that its tensile strength increases and its elongation increases by approximately 1.3 to 1.7 times. As for the elongation, incorporation of the cross-linked vinyl chloride copolymer even in a small amount, i.e. 3% appears enough for practical use.

For purposes of comparison, the above examples were repeated wherein an acrylic polymer (commercially available for blending with polyvinyl chloride; [$\eta$]=2.07, in $CHCl_3$ at 25° C.; composition, methyl methacrylate/ethyl acrylate=90/10) was substituted for resin I with all other conditions remaining substantially the same.

Characteristics of the resultant sheet are shown in Table 2.

TABLE 2

| Added amounts of acrylic polymer (percent) | Haze (percent) | Tensile strength (kg./cm.$^2$) | Elongation (percent) |
|---|---|---|---|
| 1 | 11.8 | 54.2 | 500.8 |
| 3 | 11.2 | 53.6 | 512.3 |
| 5 | 12.4 | 55.8 | 540.0 |
| 10 | 24.5 | 56.8 | 539.1 |
| 20 | 30.6 | 57.2 | 548.7 |

The sheet, as compared with that prepared from polyvinyl chloride without adding the acrylic polymer, exhibits a higher tensile strength and elongation at a high temperature, but, is inferior to that prepared by the incorporation of resin I in all round properties, particularly in transparency and surface lustre. Further, concerning haze of a thin plate prepared from the sheet compression molding, it increases remarkably in the case where the incorporated amount of the acrylic polymer exceeds 10%, which is in striking contrast to the fact that the thin plate of this invention exhibits an equal or less haze than that prepared from polyvinyl chloride without adding resin I.

EXAMPLE 2

Processes of Example 1 were repeated wherein the used amounts of EDMA were varied in the preparation of cross-linked vinyl chloride copolymers and 5 parts of the copolymer was added to 100 parts of polyvinyl chloride in the preparation of the sheet with all other conditions remaining substantially the same. Characteristics of the sheet are shown in Table 3.

TABLE 3

| Used amounts of EDMA (percent) | Haze (percent) | Tensile strength (kg./cm.²) | Elongation (percent) |
|---|---|---|---|
| 0.1 | 7.7 | 58.7 | 498.7 |
| 0.5 | 9.0 | 57.1 | 523.3 |
| 1 | 9.0 | 60.9 | 551.9 |
| 2 | 8.9 | 60.4 | 554.9 |
| 3 | 9.7 | 60.8 | 560.1 |
| 5 | 10.2 | 59.3 | 559.3 |

As a yardstick for comparing the cross-linked structure, the degree of swelling was determined as follows: Films having a thickness of 0.2 mm. were compression molded from the cross-linked vinyl chloride copolymer at a temperature of 185° C. After 0.3 g. of the film specimen was left standing in 50 ml. of tetrahydrofuran at a temperature of 30° C. for 48 hours and then filtered by 100 mesh wire screen, a weight of the swollen specimen (referred to as $W_1$) and then, an absolute dry weight thereof (referred to as $W_2$) were measured. Degree of swelling was calculated from the equation:

$$\text{Degree of swelling} = (W_1 - W_2)/W_2$$

Degree of swelling of the resultant sheets are shown in Table 4.

TABLE 4

Used amounts of EDMA (percent): Degree of swelling
- 0.1 — 13.3
- 0.5 — 11.4
- 1 — 9.9
- 2 — 10.1
- 3 — 9.5
- 5 — 9.3

It is observed that, with an increase of the amount of EDMA used, degree of swelling decreases and haze somewhat increases, and elongation also increases, but it is levelled off when the amount of EDMA used excess 3%, i.e. degree of swelling falls below 9.5. These phenomena appear to show that the copolymer of the invention has a sufficiently cross-linked structure for achieving the object of the invention.

EXAMPLE 3

Processes of Example 1 were repeated wherein divinylbenzene (referred to as DVB for brevity), di-, tri- and tetraethylene glycol dimethacrylates (referred to as di-, tri- and tetra-EDMA for brevity, respectively) were separately used in place of EDMA as a polyfunctional monomer in amounts of 2% in the preparation of cross-linked vinyl chloride copolymer and 5 parts of the above copolymer were incorporated into 100 parts of polyvinyl chloride with all other conditions remaining substantially same.

Characteristics of the resutlant sheets are shown in Table 5. It is clear that all the sheets of the example, as compared with that prepared from polyvinyl chloride without adding the cross-linked vinyl chloride copolymer, have a greater tensile strength and elongation.

TABLE 5

| Polyfunctional monomer | Haze (percent) | Tensile strength (kg./cm.²) | Elongation (percent) |
|---|---|---|---|
| DVB | 10.4 | 58.2 | 538.4 |
| Di-EDMA | 9.6 | 61.3 | 549.0 |
| Tri-EDMA | 10.1 | 61.0 | 552.1 |
| Tetra-EDMA | 9.5 | 59.4 | 543.8 |

EXAMPLE 4

250 parts of deionized water and 0.3 part of polyvinyl alcohol $$(\overline{DP} \doteqdot 2{,}000)$$

were charged into an autoclave. After the mixture was blown with nitrogen, 100 parts of vinyl chloride, in which 0.6 part of lauroyl peroxide and 10 parts of EDMA had been dissolved, were added into the autoclave, and followed by performing suspension polymerization at a temperature of 50° C. over a period of 15 hours while being stirred. The resultant granular polymer was recovered by filtration, washed with water, dried, and thereafter, blended with polyvinyl chloride and shaped into a sheet in a similar manner to that of Example 1.

Characteristics of the thin plate prepared from the sheet by compression molding are shown in Table 5. It is evident from Table 6 that the plate exhibits less haze and a greater tensile strength and elongation than that prepared from polyvinyl chloride without adding the cross-linked vinyl chloride copolymer.

TABLE 6

| Added amounts of crosslinked vinyl chloride copolymer (percent) | Haze (percent) | Tensile strength (kg./cm.²) | Elongation (percent) |
|---|---|---|---|
| 3 | 8.8 | 54.8 | 512.2 |
| 5 | 9.7 | 53.3 | 541.4 |
| 10 | 9.8 | 59.4 | 553.8 |

EXAMPLE 5

All the vinyl chloride polymer compositions were shaped into pipes each having inner and outer diameters of 20 mm. and 23 mm., respectively, at a temperature of 195° C., from which cylindrical bottles having a diameter of 50 mm. and a height of 180 mm. were blow-molded on a 5.5-sec. cycle. The resulting bottles, as compared with those manufactured from polyvinyl chloride without adding the cross-linked vinyl chloride copolymer, exhibited excellent transparency and surface lustre, less distortion at the weld-line part and an attractive appearance.

EXAMPLE 6

All the sheets, mentioned in Example 1, were pressed into thin plates each having a thickness of 1.3 mm., from which cylindrical trays having a diameter of 100 mm. and a depth of 50 mm. were shaped by vaccum forming.

The sheet of the present invention, as compared with that manufactured from polyvinyl chloride without adding the cross-linked vinyl chloride copolymer, had greater latitude as to the temperature range at which vacuum forming could be effected and the shaped article exhibited excellent lustre.

Further, using various molds having a diameter of 100 mm. and different depth from each other, a vacuum forming test was made.

Shaping characteristics are shown in Table 7, in which "adaptation temperature," "foaming temperature" and "mold depth" indicate "a minimum temperature which is warm enough to result in good adaptation of the test specimen to the shape of a mold," "a minimum temperature at which the test specimen begins to foam" and "a maximum depth of a mold at which pinhole-like cracks are not created," respectively.

TABLE 7

| Added amounts of the cross-linked vinyl chloride copolymer (percent) | Vacuum forming temperature | | Mold depth (mm.) |
| | Adaptation temperature (° C.) | Foaming temperature (° C.) | |
|---|---|---|---|
| 0 | 78 | 151 | 70 |
| 0.1 | 79 | 159 | 80 |
| 0.5 | 80 | 166 | 80 |
| 1.0 | 80 | 172 | 100 |
| 3 | 82 | 175 | 100 |
| 5 | 81 | 181 | 100 |
| 10 | 83 | 184 | 100 |

A polyvinyl chloride sheet not containing the cross-linked vinyl chloride copolymer, in the case of a mold depth exceeding 70 mm., proved to lack uniformity in thickness of the resulting article and it burst. On the contrary, the sheet of the present invention exhibited only some pinhole-like cracks and a slight unevenness in thickness, even when the mold depth reached 100 mm. The above phenomena correspond closely with the fact that there exists a greater difference in tensile strength and elongation at a high temperature between the polyvinyl chloride sheet and the sheet of the invention, and show that the composition of the present invention may also be used in the manufacture of vacuum-formed articles having a greater depth.

What we claim is:

1. A transparent vinyl chloride shaped article comprising a homogeneous composition consisting essentially of
   (a) 80 to 99.9% by weight, based on the weight of said composition, of a vinyl chloride homopolymer or copolymer containing 50 to 100% by weight of vinyl chloride and 0 to 50% by weight of at least one copolymerizable ethylenic unsaturated monomer, and having homogeneously dispersed therein
   (b) 0.1 to 20% by weight, based on the weight of said composition, of a cross-linked vinyl chloride copolymer prepared by emulsion a mixture of 50 to 99.95% by weight of vinyl chloride, 0 to 49.95% by weight of at least one copolymerizable ethylenic unsaturated monomer and 0.05 to 10% by weight of at least one copolymerizable polyfunctional monomer.

2. A vinyl chloride shaped article according to claim 1 wherein component (b) is homogeneously dispersed in component (a) by extrusion.

3. A vinyl chloride shaped article according to claim 2, wherein said copolymerizable polyfunctional monomer is at least one selected from the group consisting of divinylbenzene, divinyl adipate, glycidyl acrylate, glycidyl methacrylate, ethylene glycol dimethacrylate, ethylene glycol diacrylate, diethylene glycol dimethacrylate, diethylene glycol diacrylate, triethylene glycol dimethacrylate, triethylene glycol diacrylate, tetraethylene glycol dimethacrylate, tetraethylene glycol diacrylate, bis(ethylene glycol) phthalate diacrylate, bis(ethylene glycol)phthalate dimethacrylate, bis(diethylene glycol)phthalate diacrylate, bis(diethylene glycol)phthalate dimethacrylate, allyl methacrylate, diallyl phthalate, diallyl maleate, diallyl itaconate and triallyl cyanurate.

References Cited

UNITED STATES PATENTS

| | | | |
|---|---|---|---|
| 3,345,434 | 10/1967 | Griffith | 260—901 |
| 3,475,361 | 10/1969 | Garner | 260—23 |
| 3,510,543 | 5/1970 | Kühne et al. | 260—876 |

MURRAY TILLMAN, Primary Examiner

C. I. SECCURO, Assistant Examiner

U.S. Cl. X.R.

260—23 XA, 897 C